United States Patent

Szczepanski

[11] 4,296,402

[45] Oct. 20, 1981

[54] VEHICLE ANTI-THEFT DEVICE

[76] Inventor: Slawomir Z. Szczepanski, 5455 N. Sheridan Rd., Chicago, Ill. 60640

[21] Appl. No.: 136,412

[22] Filed: Apr. 2, 1980

[51] Int. Cl.³ .................................................. B60R 25/04
[52] U.S. Cl. ................................. 340/64; 307/10 AT; 123/179 BG; 180/287
[58] Field of Search ............... 340/63, 64; 307/10 AT; 180/287; 123/179 R, 179 A, 179 B, 179 BG

[56] References Cited

U.S. PATENT DOCUMENTS 4,157,479 6/1979 Chan .............................. 307/10 AT

*Primary Examiner*—Alvin H. Waring
*Attorney, Agent, or Firm*—S. Z. Szczepanski

[57] ABSTRACT

A vehicle anti-theft system includes a four-node bridge network having a removable resistor. The network includes a first resistive segment having a resistance $R_1$ between a first interface node and a first intermediate node, a second resistive segment having a resistance $R_2$ between the first intermediate node and the second interface node, a third resistive segment between said second intermediate node and said second interface node having a resistance $R_3$ and including a removable resistor and a fourth resistive segment having a resistance $R_4$ between the second intermediate node and the first interface node. The resistances $R_1$, $R_2$, $R_3$ and $R_4$ satisfy the equation $R_3R_1=R_2R_4$. The first interface node and the second interface node are electrically connected to the ignition system of the vehicle on either side of the ignition switch. Turning of the ignition switch while the removable resistor is either not in the circuit or has a resistance such that the resistance of the third resistive segment is different from $R_3$ causes activation of a coil connected to the first intermediate node and the second intermediate node. The coil in turn disconnects the current to a part of an automobile electrical system, which is essential to the operation of the motor of the vehicle and it can also activate an alarm.

15 Claims, 7 Drawing Figures

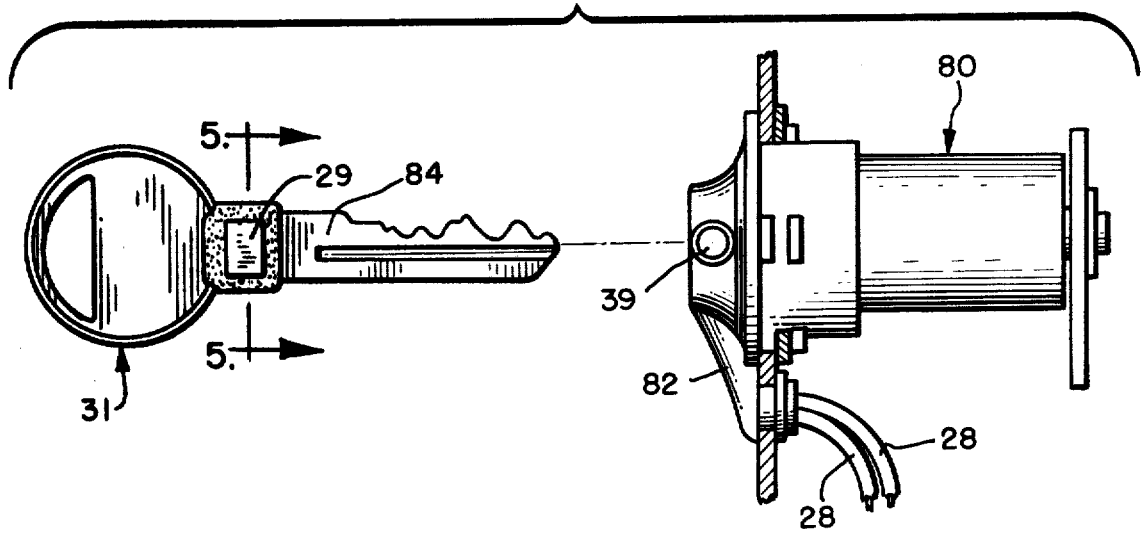
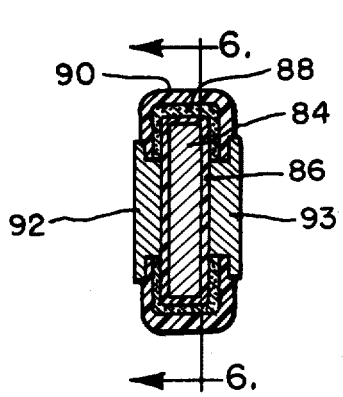
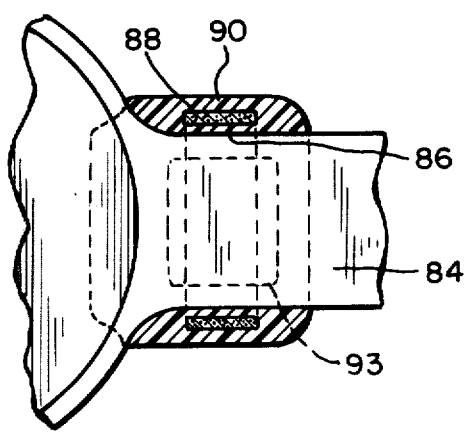
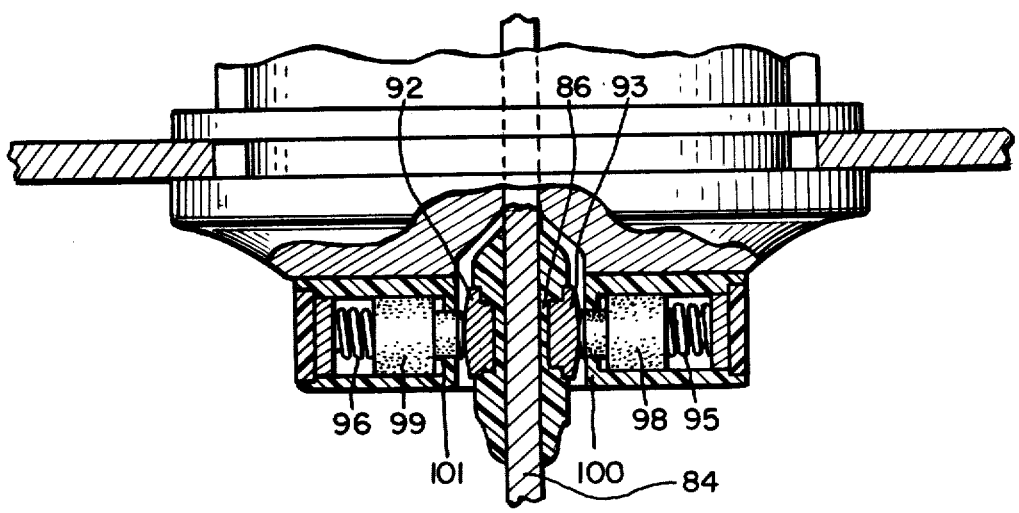

VEHICLE ANTI-THEFT DEVICE

BACKGROUND OF THE INVENTION

This invention relates to electrical anti-theft devices useful in preventing thefts of automotive vehicles.

Many types of anti-theft systems have been proposed to combat the continuing problem of vehicle theft. One approach is to provide sensors which activate a siren whenever an unauthorized entry is made into the vehicle. Another approach is to provide a hidden switch which disconnects the ignition system. Yet another approach is to provide a removable part without which the vehicle cannot be started. The U.S. Pat. No. 3,492,494 (Clark, et al.) proposes the use of an electronic switch that includes a removable resistor which can be located on an ignition key and without which the ignition key will not energize the starter motor of the vehicle.

All proposed approaches suffer from inherent disadvantages which limit the usefulness of systems constructed in accordance with these approaches. For example, a system which relies on a siren to deter vehicle theft is not entirely satisfactory because the sound of the siren often does not attract immediate attention in busy cities. It is also difficult to determine which vehicle is being broken into. Similarly, hidden switches can be discovered or by-passed by a thief. Likewise, the removal of a part essential to the operation of a vehicle involves several disadvantages. First, it is cumbersome and inconvenient to remove various parts. Second, there is an inherent problem connected with situations where more than one person drives the vehicle, each person having his own set of keys. The person intending to drive the vehicle must obtain the removable part from the one who last drove it. The approach proposed in the Clark, et al. patent involves a complicated electronic circuit and is therefore relatively expensive.

The present invention provides an automotive anti-theft system which overcomes disadvantages inherent in the prior art systems. Thus, one object of the present invention is to provide an anti-theft system which cannot be either by-passed or disconnected by cutting wires.

Another object of the invention is to provide an anti-theft system which does not inconvenience the operator or operators of the vehicles in any manner whatsoever.

A further object of the invention is to provide an anti-theft system which is compact, and simple and inexpensive to manufacture.

A still further object of the invention is to provide an anti-theft system, a major portion of which can be mass produced in form of a low cost resistor network.

Still another object of the invention is to provide an anti-theft system which can be simply and inexpensively installed in existing or new vehicles.

Other objects of the invention will become apparent to those skilled in the art upon studying this disclosure.

BRIEF DESCRIPTION OF THE INVENTION

A vehicle anti-theft system constructed in accordance with this invention includes a four-node bridge network having a removable resistor. The network includes a first resistive segment having a resistance $R_1$ between a first interface node and a first intermediate node, a second resistive segment having a resistance $R_2$ between the first intermediate node and the second interface node, a third resistive segment between said second intermediate node and said second interface node having a resistance $R_3$ and including a removable resistor and a fourth resistive segment having a resistance $R_4$ between the second intermediate node and the first interface node. The resistances $R_1$, $R_2$, $R_3$ and $R_4$ satisfy the equation $R_3R_1 = R_2R_4$. The first interface node and the second interface node are electronically connected to the ignition system of the vehicle on either side of the ignition switch. Whenever the ignition switch is turned on while the removable resistor is either not in the circuit or it has a resistance such that the resistance of the third resistive segment is different from $R_3$, sensing-activating means senses an imbalance between said first intermediate node and said second intermediate node and generates in response thereto a signal to disconnect current to a part of an automobile electrical system, which is essential to the operation of the motor of the vehicle and it can also activate an alarm.

BRIEF DESCRIPTION OF THE DRAWINGS

FIG. 4 is a side-elevational view of a vehicle key and the cylinder shown in FIG. 3.

FIG. 5 is a cross-sectional view of the key of FIG. 4 taken along a line 5—5 thereof.

FIG. 6 is a partial cross-sectional view of the key of FIG. 5 taken along a line 6—6 thereof.

FIG. 7 is a cross-sectional view of the ignition lock cylinder and the key of FIG. 3 taken along a line 7—7 thereof.

DETAILED DESCRIPTION OF THE INVENTION

The anti-theft system of the present invention disables the electrical system of a vehicle by disconnecting the flow of current to an electrical component which is essential to the operation of a motor vehicle, whenever the ignition system is activated without a specified removable resistance being placed in the ignition system. The removable resistance is preferably mounted on an ignition key. When the ignition system is turned on by a key which does not have a resistor having the resistance required in the circuit of the anti-theft device a signal for disabling the electrical system of the vehicle is produced by the anti-theft device. Similarly, when the ignition system is activated without a key the anti-theft device of the present invention produces a signal for disabling the electrical system of the vehicle. One important advantage of the anti-theft system of the present invention is that it cannot be by-passed or avoided by cutting accessible wires. Another important advantage of the present invention is its simplicity. The system includes only passive components: four resistors, a coil and a switch. Accordingly, the system occupies a small volume; it can be cheaply and simply mass-produced; and, it is reliable. A further advantage of the system of the present invention is it is rendered operational whenever current flows into the starter relay, even when the car is being jumped started.

Although the system of the present invention is particularly useful in automobiles and other motor vehicles, it can be used in any similar system that is activated by an electrical circuit using a key. The construction and operation of the invention will be described herein in connection with a system used in an automobile.

Figure 1:
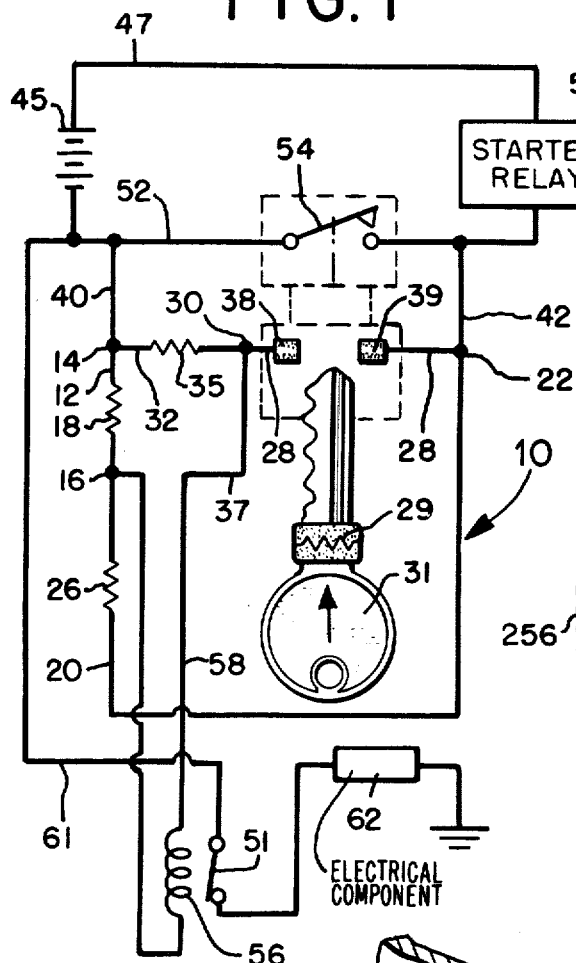
FIG. 1 is a schematic representation of a vehicle ignition system which includes an anti-theft system constructed in accordance with the present invention.

Referring now to the FIGURES, the anti-theft system constructed in accordance with this invention is generally designated in FIG. 1 by a numeral 10. The system 10 includes a four-node bridge network. The four nodes define four resistive segments and each segment of the network includes a resistor. Thus, a conductor 12 connecting a first interface node 14 and a first intermediate node 16 includes a resistor 18; a conductor 20 connecting the first intermediate node 16 and a second interface node 22 includes a resistor 26; a conductor 28 connecting the second interface node 22 and a second intermediate node 30 includes a removable resistor 29 on a key 31; and, a conductor 32 connecting the second intermediate node 30 and the first interface node 14 includes a resistor 35. When placed in the circuit, the removable resistor 29 is in contact with electrical contacts 38 and 39. A conductor 37 connects nodes 16 and 30.

The nodes 14 and 22 of the four-node bridge network are connected by conductor 40 and 42, respectively, to a starter-relay circuit that includes a car battery 45, a 47, a conventional starter relay 50 and a conductor 52 having a conventional ignition switch 54. The conductor 40 and 42 are connected to the conductor 52 on opposite sides of the ignition switch 54.

The conductor 37 is connected to a grounded coil 56 via a conductor 58 so that whenever there is a required voltage differential between nodes 16 and 30 the current flowing through the lead 37 activates coil 56 which opens the normally-closed switch 51. The opening of the switch 51 disconnects the flow of current from an electrical source such as battery 45, through conductor 61 into an electrical component 62 of the vehicle electrical system which is essential to the operation of the motor vehicle.

Figure 2:
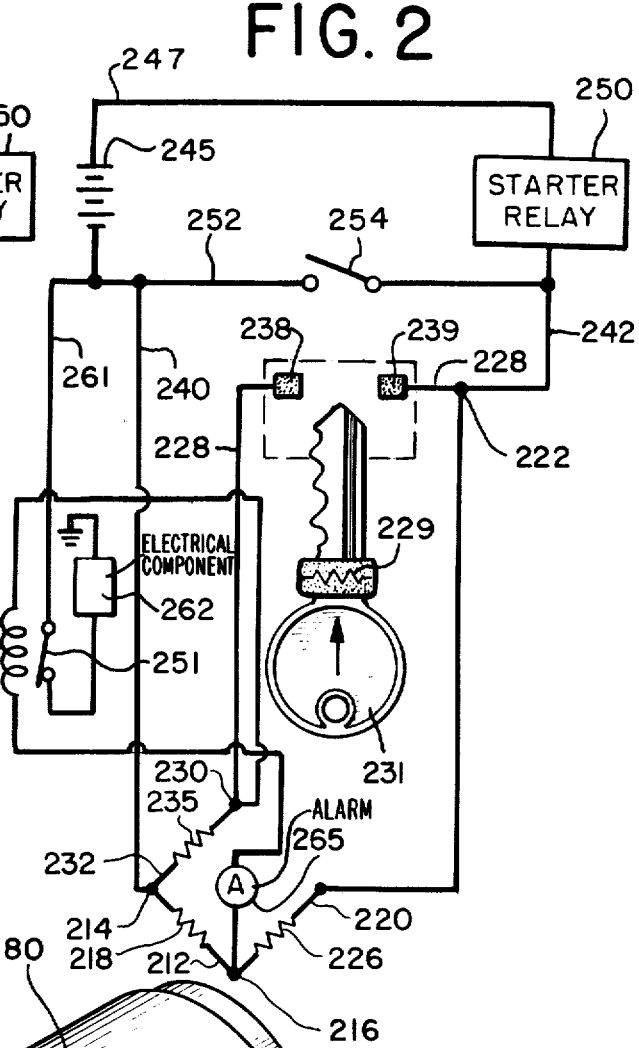
FIG. 2 is a schematic representation of another vehicle ignition system which includes an anti-theft system constructed in accordance with the present invention.

A system depicted in FIG. 2 is substantially the same as that of FIG. 1 except that it includes an alarm 265. The parts of FIG. 2 corresponding to those of FIG. 1 are designated by the same numerals but preceded by a numeral 2.

Figure 3:
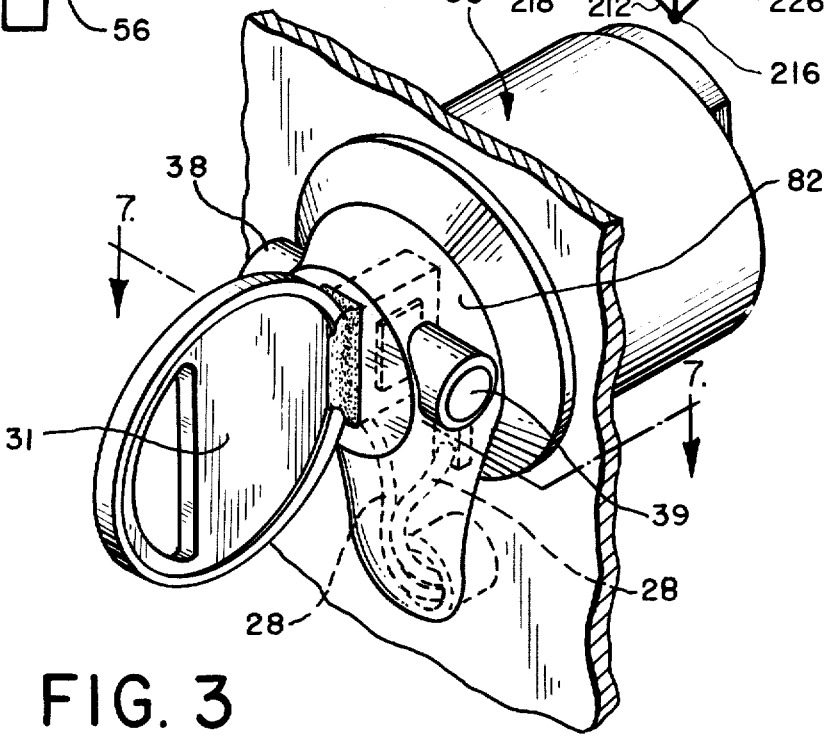
FIG. 3 is a perspective view of an ignition lock cylinder and a key, both constructed in accordance with the present invention.

FIG. 3 shows the key 31 in a conventional ignition lock cylinder modified to incorporate the system of the present invention. The cylinder is designated generally by a numeral 80. It includes conductors 28 which are electrically connected to contacts 38 and 39. The contacts 38 and 39, and the conductors 28 are under a protective cover 82. As depicted in FIG. 4, the key 31 has mounted thereon a resistor 29. The manner in which the resistor 29 is mounted on the key 31 can best be explained by referring to FIGS. 5–6. The key shaft 84 is surrounded by an insulator 86. Around the insulator 86 there is provided a layer of resistive material 88 which gives the desired resistance $R_3$ between contacts 38 and 39. Partly surrounding the resistive layer 88 is an insulating layer 90. The resistive layer 88 is in contact with conductive discs 92 and 93 on either side of the key shaft 84. Any resistive material which provides required resistance can be used to form the layer 88. Materials such as cermets, conductive plastics, carbon are generally useful for that purpose. Cermets are especially preferred because of their low temperature coefficient ratio, good stability, excellent resistance to abrasion and good electrical properties. The methods of making various cermet resistive materials are described, for example, in U.S. Pat. Nos. 3,304,199; 3,274,669; 3,271,193; 3,149,002; 3,052,573; 2,950,996; 2,950,995, the disclosure of which are incorporated herein by reference.

To assure a good electrical contact between the key and contacts 38 and 39, the contacts 38 and 39 include helical springs 95 and 96 which urge the sliding cylinders 98 and 99 inside the housing 100 and 101 against the discs 92 and 93, respectively. The resistors 12, 26, 29 and 35 are selected such that their resistances $R_1$, $R_2$, $R_3$ and $R_4$ satisfy the equation $R_1R_2 = R_3R_4$. The resistances chosen to divert through the conductors 40 and 42 a sufficiently small amount of current so as to avoid any significant effect on the normal operation of the starter relay 50 but a sufficiently large amount of current to permit the activation of the normally closed switch 51 whenever the removable resistance inserted into the four-node bridge network differs by a predetermined value from the resistance $R_3$. Generally, the value of the removable resistor that would trigger the opening of the switch 51 should be sufficiently different from $R_3$ to allow for random currents and slight variations in contact resistance between the contacts 38 and 39 and the removable resistor 29. Accordingly, when references are made in this disclosure to current flowing between intermediate nodes 30 and 16, it should be understood that means sufficient current to activate the coil. In some instances amplifiers can be added to the anti-theft system's circuit in order to amplify the current so that the coil is opened at a lower current value. The coil 56 can be any conventional coil which can open when activated by switch 51. The switch 51 is preferably a latching relay which once opened remains in open position until it is manually reset. The manual reset feature prevents the thief from discovering the $R_3$ resistance by a trial and error procedure. Once the first attempt is made car's electrical system remains disabled. The electrical component 62 can be, for example, a distributor, a solenoid or a conductor leading to one or more of the above.

As shown in FIGS. 3 and 4, the only conductors of the anti-theft device, which extend into the cylinder 80 inside the passenger compartment are conductors 28. The alarm system of the invention remains operative even when either or both of the conductors 28 are cut. In fact cutting the conductor 28 practically assures activation of the switch 51 into an open position because the resistance of $R_3$ is then equal to zero causing an imbalance in the four-node bridge network. Since the remaining part of the anti-theft circuit of the present invention is preferably hidden and since the anti-theft circuit can be an extremely small printed chip, it would be virtually impossible for the thief to disconnect the anti-theft system of the present invention.

The anti-theft system can be easily incorporated in the design of new automobiles and it can be easily and inexpensively incorporated into existing vehicles. A resistor 29 is applied onto all keys 31. The cylinder is modified to include the contacts 38 and 39 which are connected by conductors 28 to the remainder of the preferably printed circuit 10. The printed circuit 10 is then mounted in an obscure location. Finally a switch 51 is incorporated into a conductor leading to an electrical component 62.

In operation, the authorized driver can use the car equipped with the anti-theft system of the present invention without the slightest inconvenience or change in his usual routine. However, when a thief closes or by-passes the switch 54, the current through the conductor 37 and the conductor 58 activates the coil 56 which opens the switch 51. The thief cannot try to match the resistance because as soon as the current begins flowing into the starter relay 50, without resistor $R_3$ in place, the hidden switch 51 is opened preventing any further experimentation.

Many changes and modifications of the invention described herein will become apparent upon studying this disclosure. All such changes and modifications which fall within the spirit of the invention are intended to be included within this scope.

I claim:

1. An anti-theft device for a motor vehicle having an electrical system including a starter relay, said device comprising:

a four-node electrical network including a first resistive segment having a predetermined resistance $R_1$ between a first interface node and a first intermediate node, a second resistive segment having a predetermined resistance $R_2$ between the first intermediate node and a second interface node, a third resistive segment having a predetermined resistance $R_3$ between the second interface node and a second intermediate node, a fourth resistive segment having a predetermined resistance $R_4$ between the second intermediate node and the first interface node, said resistances $R_1$, $R_2$, $R_3$, and $R_4$ satisfying the equation $$R_1R_3=R_2R_4$$

at least a part of said third resistive segment being removable, said first and second interface nodes being connected to the electrical system of the motor vehicle such that a voltage differential is created between the first and the second interface nodes when the electrical system is activated;

means for detecting an imbalance in an electrical property between said first intermediate node and said second intermediate node whenever the resistance of the third resistive segment is different from $R_3$ and for generating in response thereto an output signal;

an electrical component; and means for receiving the output signal and for disabling in response thereto said electrical component, said component selected such that means for receiving and disabling does not prevent normal operation of the starter relay but prevents operation of the engine.

2. A device as defined in claim 1 further comprising an alarm activated by said output signal.

3. A device as defined in claim 1 wherein said detecting and generating means comprises:

a conductor connected to said first intermediate node and to said second intermediate node;

and wherein said receiving and disabling means comprises:

a coil having a first terminal connected to said conductor and a second terminal connected to ground; and a switch in the electrical system of the vehicle, activated by current flowing through the coil.

4. A system as defined in claim 3 further comprising an alarm activated by said output signal.

5. A device as defined in claim 1 wherein the removable part of said resistive segment is mounted on a key.

6. A device as defined in claim 1 wherein said resistive segments include only non-active components.

7. A device as defined in claim 1 wherein said resistive segments include only resistors.

8. A device as defined in claim 1 wherein the removable part of said third resistive segment comprises a resistive film deposited on a key.

9. In an improved ignition system for a motor vehicle having an engine and an electrical system for starting said engine including a battery, a starter relay electrically connected to said battery and an ignition switch between said starter relay, said battery and an electrical component essential to the operation of the engine, the improvement comprising:

a four-node electrical network including a first resistive segment having a predetermined resistance $R_1$ between a first interface node and a first intermediate node, a second resistive segment having a predetermined resistance $R_2$ between the first intermediate node and a second interface node, a third resistive segment having a predetermined resistance $R_3$ between the second interface node and a second intermediate node, a fourth resistive segment having a predetermined resistance $R_4$ between the second intermediate node and the second interface node, said resistances $R_1$, $R_2$, $R_3$, and $R_4$ satisfying the equation $$R_1R_3=R_2R_4$$

at least a part of said third resistive segment being removable, said input node and said output node being connected to the ignition circuit of the motor vehicle such that a voltage differential is created between the first and the second interface nodes when the electrical system is activated;

means for detecting imbalance in an electrical property between said first intermediate node and said second intermediate nodes whenever the resistance in the third resistive segment is different from $R_3$ and for generating in response thereto an output signal; and means for receiving the output signal and for disabling in response thereto said electrical component, said component secreted such that the means for receiving and disabling does not prevent normal operation of the starter relay but prevents operation of the engine.

10. A system as defined in claim 9 wherein said resistive segments include only non-active components.

11. A system as defined in claim 9 wherein said resistive segments comprise resistors.

12. A system as defined in claim 9 wherein the removable part of said third resistive segment comprises a resistive film deposited on a key.

13. An improved motor vehicle electrical system comprising:

a battery;

a starter relay;

an ignition switch;

an ignition circuit conductor electrically connecting said battery and said starter relay;

an ignition key;

a resistive film deposited on said ignition key;

a four-node electrical network including a first resistive segment having a predetermined resistance $R_1$ between a first interface node and a first intermediate node, a second resistive segment having a predetermined resistance $R_2$ between the first intermediate node and a second interface node, a third resistive segment between the second interface node and a second intermediate node, said third resistive segment having an interrupt, electrical contacts being on either side of said interrupt, a fourth resistive segment having a predetermined resistance $R_4$ between the second intermediate node and the first interface node, said resistive film contacting said contacts and connecting said interrupt, this completing said segment when said key is inserted into said ignition switch, said third resistive segment having a resistance $R_3$ when said resistive film is contacting said contacts, said resistances $R_1$, $R_2$, $R_3$, and $R_4$ satisfying the equation $$R_1R_3 = R_2R_4$$

said first interface node being electrically connected to said ignition circuit conductor on one side of said ignition key, said second interface node being electrically connected to said ignition circuit conductor on the other side of said ignition key;

means for detecting an imbalance in an electrical property between said first intermediate node and said second intermediate node whenever the resistance $R_3$ of said third segment is different from $R_3$ while said starter relay is being activated and for generating in response thereto an output signal; and means for receiving the output signal and for disabling in response thereto said electrical component, said component selected such that means for receiving and disabling does not prevent normal operation of the starter relay but prevents the operation of the engine.

14. A system as defined in claim 13 wherein said means for detecting and generating comprises a conductor connected to said first intermediate node and to said second intermediate node.

15. A system as defined in claim 14 further comprising an alarm activated by said output signal.

* * * * *